Dec. 17, 1968 K. KUPFERBERG 3,416,597

HEAT SINK FOR FORCED AIR OR CONVECTION COOLING OF SEMICONDUCTORS

Filed June 15, 1967

3 Sheets-Sheet 1

INVENTOR.
KENNETH KUPFERBERG
BY
Alfred W. Barber
ATTORNEY

Dec. 17, 1968 K. KUPFERBERG 3,416,597

HEAT SINK FOR FORCED AIR OR CONVECTION COOLING OF SEMICONDUCTORS

Filed June 15, 1967 3 Sheets-Sheet 2

INVENTOR.
KENNETH KUPFERBERG
BY
Alfred W. Barber
ATTORNEY

Dec. 17, 1968 K. KUPFERBERG 3,416,597

HEAT SINK FOR FORCED AIR OR CONVECTION COOLING OF SEMICONDUCTORS

Filed June 15, 1967

3 Sheets-Sheet 3

INVENTOR.

KENNETH KUPFERBERG

BY

Alfred W. Barber

ATTORNEY

United States Patent Office 3,416,597
Patented Dec. 17, 1968

3,416,597

HEAT SINK FOR FORCED AIR OR CONVECTION COOLING OF SEMICONDUCTORS

Kenneth Kupferberg, Flushing, N.Y., assignor to Forbro Design Corp., New York, N.Y., a corporation of New York Filed June 15, 1967, Ser. No. 654,025
11 Claims. (Cl. 165—80)

ABSTRACT OF THE DISCLOSURE

Semiconductor devices, such as transistors and the like, require heat sinking means if they are to be operated at the power levels for which they are intended. The heat generated in the device is conducted to the case of the device but the typical case by itself has little heat dissipating ability. Thus, while the thermal resistance between the semiconductor and its case may be very low, the thermal coupling of the case to the surrounding atmosphere presents a very high thermal resistance. In order to reduce the thermal resistance between the semiconductor and the atmosphere heat sinks are used. These are metal plates or finned metal configurations on which the transistor is mounted. Typically these are aluminum extrusions providing thermal resistances of a few degrees centigrade per watt of dissipation of the semiconductor.

The present invention provides methods of and means for greatly reducing the thermal resistance of a semiconductor to the atmosphere. Metal fins are used to conduct the heat to the atmosphere which are of improved design and improved means for thermally coupling the semiconductor to these fins. The result is an improved heat sink capable of accommodating a large number of semiconductors; providing extremely low effective thermal resistance between the heat source and the atmosphere and in a relatively small space; and adapted to either forced air or convection cooling. A metal base piece in the shape of a U provides two mounting surfaces for the semiconductors and as a means for mounting to a chassis or the like, and provides short, low thermal resistance paths to the cooling fins mounted thereon. The fins are press fitted to two legs of the U and are provided with tabs for providing low thermal resistance couplings.

*Background of the invention*

(1) *Field of the invention.*—The present invention relates to heat exchangers (Class 165) and, in particular, to heat sinks suitable for use in cooling semiconductors by either convection or forced air.

(2) *Description of the prior art.*—Heat sinks for semiconductors and the like are commonly made by extruding aluminum to form a finned structure from which some of the fins are cleared over an area to permit mounting the semiconductors. There are a limited number of configurations which can be made by this method. The limitations of form lead to a limitation of the efficiency or thermal resistance which can be obtained by this method of fabrication. This limitation on possible configurations also limits the dissipation which can be achieved in a given space. Typically the distance between the device to be cooled and the fins of the heat sink vary widely so that there is usually a large thermal gradient at various points in the heat sink.

*Summary*

In accordance with the present invention a heat sink is provided which is smaller, more efficient and has lower thermal resistance to the atmosphere with convection or forced air cooling than has hitherto been possible. A base structure in the shape of a U provides two side surfaces for mounting a large number of semiconductors and an end surface for mounting to a chassis or the like. Circuit components may also be carried on boards mounted inside the U and parallel with its sides. The cooling fins are bridged across the sides of the U to form very low thermal resistance paths for the heat from the semiconductors. Air blown in through the U and out through the fins, first cools the semiconductors and the components on the boards with cool air and then carries off the heat from the fins. The fins are formed with tabs and are pressed onto the sides of the U thereby providing very low thermal resistance paths between the semiconductors and the heat dissipating fins. The fins may be bonded as by soldering or cementing to fill any voids, to increase conductivity and to make mechanically strong.

Accordinily, a major objective of the present invention is to provide methods of and means for an improved heat sink for semiconductors and the like.

Another object is to provide lower thermal resistance between semiconductors and the atmosphere than has hitherto been possible in a given space.

Still another object is to provide a small very efficient heat sink capable of cooling a plurality of semiconductors and associated circuitry.

A further object is to provide a heat sink for semiconductors or the like which is adapted to efficient operation with either convection or forced air cooling.

A still further object is to provide a heat sink for semiconductors or the like which may be constructed with a single or a double tier of fins.

Another object is to provide a heat sink which may readily be fabricated and thus removing the limitations imposed in the design of extruded heat sinks.

Another object is to provide an efficient heat sink in which a large number of fins can be located to provide short, parallel and substantially equidistant heat flow paths from the semiconductor being cooled.

Still another object is to provide a heat sink configuration exhibiting very low thermal resistance between the device being cooled and the fins which in turn can provide an extremely large effective radiating surface to the atmosphere.

A further object is to provide an efficient but at the same time a low cost heat sink.

These and other objects will be apparent from the detailed description of the invention given in connection with the various figures of the drawings.

*Description of the preferred embodiments*

Figure 1:
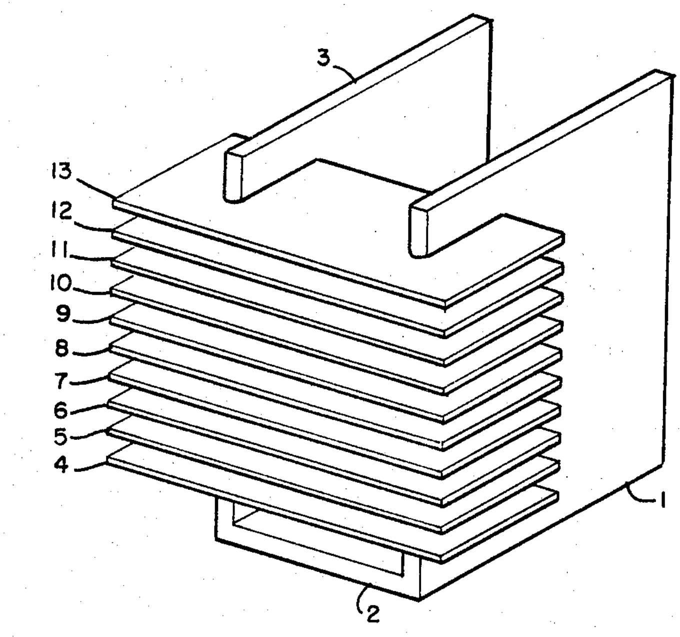
FIGURE 1 is a perspective view of one form of semiconductor heat sink constructed in accordance with the present invention.

FIGURE 1 shows how the heat sink in accordance with the present invention is constructed using a U base 1–2–3 carrying a plurality of parallel fins 4–13 inclusive.

The sides 1 and 3 present flat areas suitable for carrying a plurality of semiconductors to be cooled. The end area 2 is suitable for mounting the heat sink to a chassis or the like. The U is constructed of high heat-conductive metal such as copper and is substantially thicker than the fins 4–13. It has been found, for example, that with this construction efficient heat sinks can be fabricated using fins of relatively thin metal. For example, ⅛ inch thick copper may be used for the U and 0.01 inch thick material may be used for the fins thereby saving considerably in weight and material while providing an efficient heat coupling between the semiconductors and the atmosphere. Textured metal may be used for the fins further decreasing the thermal resistance and at the same time increasing the strength and rigidity of the fins and the overall structure. This permits the use of thinner material for the fins which in turn permits more air to flow between the fins for a given air pressure and given number of fins. Or, on the other hand, it permits increasing the radiating area by permitting the use of more fins.

Figure 2:
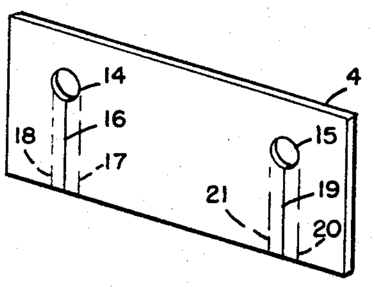
FIGURE 2 is a detail showing one method by which individual fins may be fabricated.

FIGURE 2 illustrates how one of the fins 4 can be readily fabricated. Two holes 14 and 15 are drilled or punched and slits 16 and 19 are made from these holes to the edge of the fin. The material on each side of slits 16 and 19 is pushed out or folded out along lines 17, 18 and 20, 21 to form tabs for providing increased thermal coupling between the fins and the U base.

Figure 3:
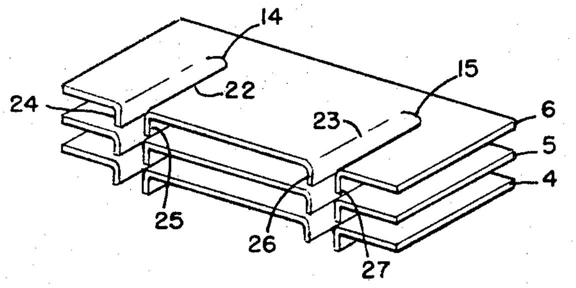
FIGURE 3 is a view illustrating the relative positioning of several fins.

FIGURE 3 shows how several fins 4, 5 and 6 are stacked with tabs 24, 25 and 26, 27 providing means for determining the spacing between fins and for maintaining the fins accurately parallel. The open slots 22 and 23 extending from holes 14 and 15 respectively are provided to receive the sides of the U base in press-fit relationship.

Figures 4, 5, 6:
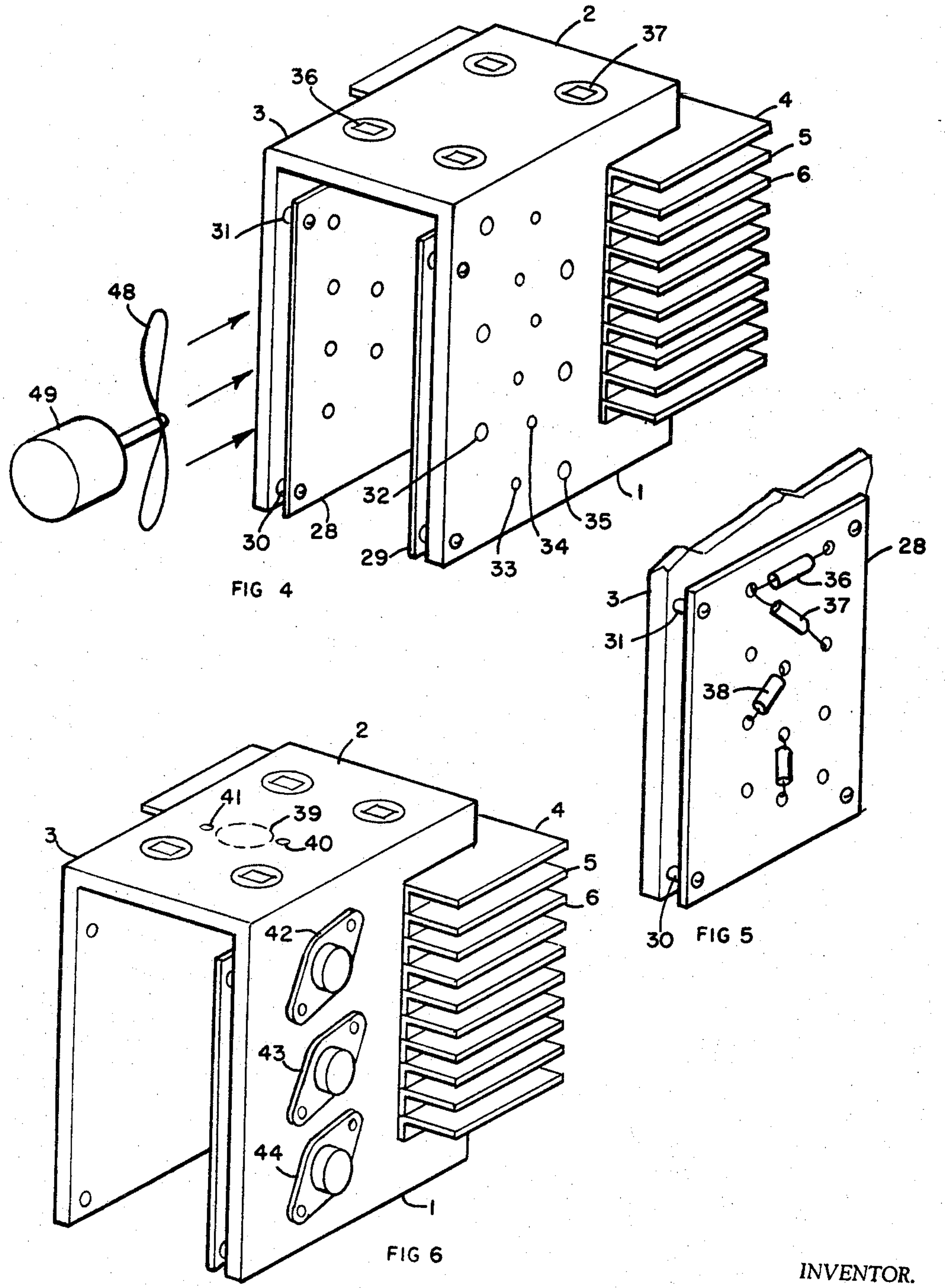
FIGURE 4 is a perspective view of the form of the invention shown in FIGURE 1 and with some additional details.
FIGURE 5 is a detail of a portion of FIGURE 4.
FIGURE 6 is like FIGURE 4 but showing transistors mounted on the heat sink.

FIGURE 4 is a view of the heat sink in accordance with the present invention like the form shown in FIGURE 1 but in an inverted position and with certain additional provisions. The bottom of the U base 2 is shown provided with a plurality of mounting holes such as 36 and 37. Side panel 1 is shown provided with a plurality of transistor mounting holes such as 32, 33, 34 and 35. The number and spacing of these holes will depend on the type and number of semiconductors to be mounted. It will be understood that the other side of the U 3 is similarly provided with semiconductor mounting holes (not visible in this view). FIGURE 4 also shows how circuit component mounting boards 28 and 29 may be mounted inside the U base and parallel with its sides 1 and 3 by means of stand-off studs or bolts as 30 and 31. When air is blown into this open end of the U as by means of a fan 48–49, the components on boards 28 and 29 are first cooled by the air before being heated by heat from fins 4, 5, 6, etc., and then the air passes through the fins cooling them. This order of cooling provides effective cooling of both the circuit components and the fins carrying heat from the semiconductors. It will be seen that passing air in the opposite direction would pass heated air over the circuit components on boards 28 and 29 and the semiconductors. Printed circuit boards 28 and 29 are most effectively cooled when they are spaced from the sides of the U as shown. This spacing also permits air to flow along the inner surface of the U. Since the air stream from the fan spreads as it moves further from the fan blades, the form factor of FIGURE 4 with its narrower portion toward the fan provides most complete use of the air stream.

It will be seen that the tabs on the fins provide low thermal resistance coupling between the fins and the semiconductor mounting surfaces 1 and 3. It will also be seen that the heat flow paths from each and every semiconductor mounting location to the fins are all short, of substantially equal length and are effectively in parallel. This mode of construction provides substantially equal cooling to each and all of the semiconductors and by the same token substantially equal thermal resistance between each of the semiconductors and the atmosphere.

FIGURE 5 is a detail of the construction of FIGURE 4 showing more clearly how the circuit component boards such as board 28 carries a plurality of circuit components as components 36, 37 38, and socket means for the semiconductors whereby the semiconductors may be readily replaced.

FIGURE 6 is a perspective view of the invention like the form shown in FIGURE 4 and with transistors 42, 43 and 44 mounted in typical fashion on side panel. This view also illustrates how in addition to providing a mounting surface the end of the base U 2 may mount a thermal overload switch 39 by providing suitable additional mounting holes as 40 and 41. The temperature at this point is influenced by heat generated on both sides of the U.

Figures 7, 8:
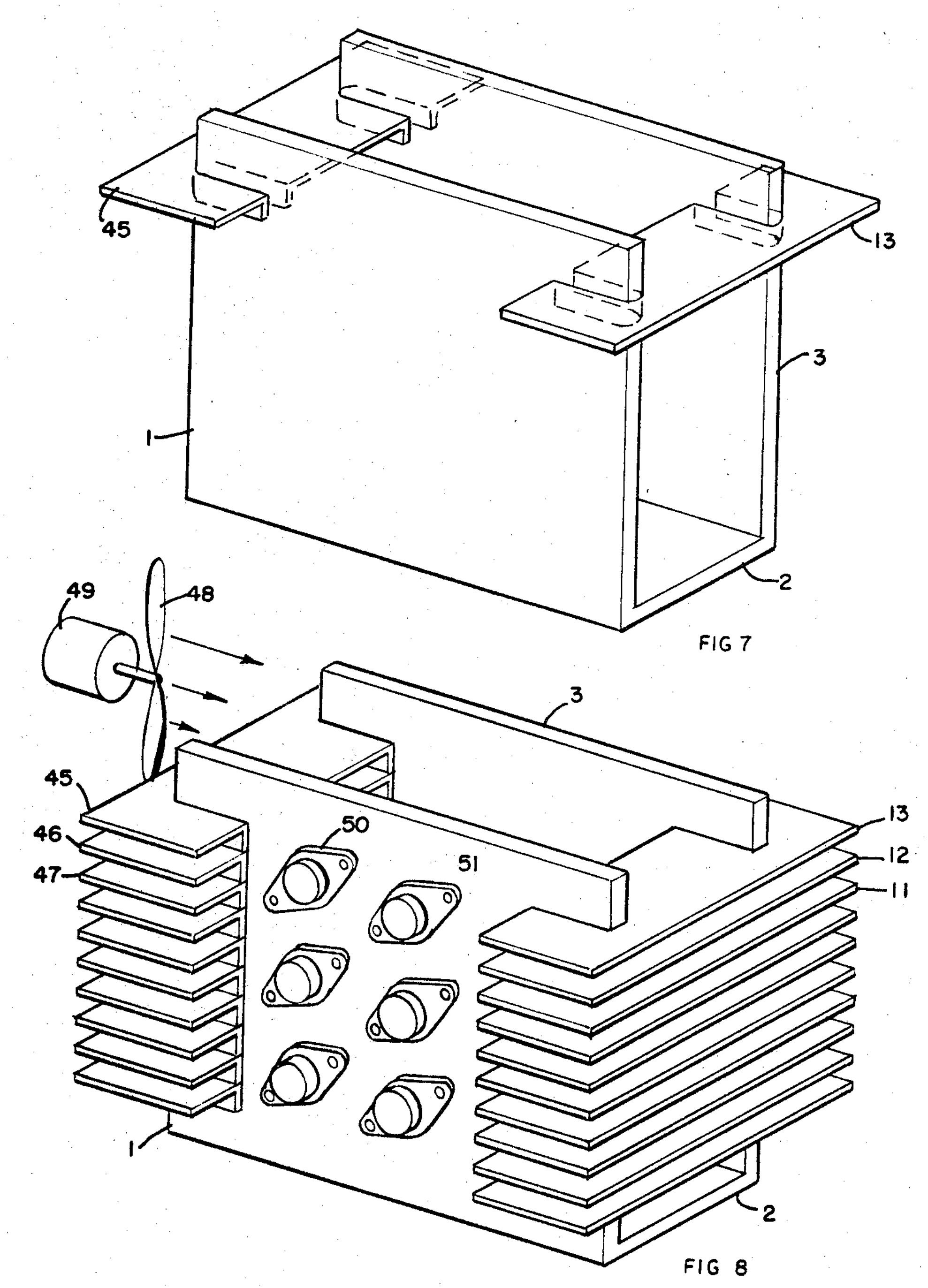
FIGURE 7 is a perspective view showing how a dual tier of fins can be used in connection with the present invention.
FIGURE 8 is a perspective view of a dual tier finned form of the present invention.

FIGURE 7 is a perspective view of a modified form of the present invention in which the U base is somewhat elongated and fine as 13 and 45 are mounted from two sides to provide for even lower thermal resistance for the semiconductors.

FIGURE 8 is a perspective view of the dual finned heat sink comprising elongated U base 1, 2, 3 carrying two tiers of fins as 11, 12, 13 etc. and 44, 45 and 46, etc. Typical semiconductors are shown mounted on the sides of the U base as 50 and 51 in two rows, each row being substantially equidistant from its corresponding tier of fins whereby effectively parallel heat paths are provided. This construction provides substantially one-half the thermal resistance of the single tiered form shown in FIGURES 1 through 6. It has been found that the best balance in cooling effects provided by the two banks of fins is obtained by using fewer fins in the bank 45–46–47 at the fan end of the assembly. A ratio of 2 to 3 has been found to be a good ratio for this purpose. The air is cooler at the fan end so that fewer fins are required for a given cooling effect and the use of fewer fins permits freer flow of air to the other bank of fins.

While only a few forms of the present invention have been shown and described, many modifications will be apparent to those skilled in the art and within the spirit and scope of the invention as set forth in particular, in the appended claims.

I claim:

1. A heat dissipating device for semiconductors and the like, including the combination of:
- a semiconductor mounting platform;
- a plurality of parallel heat dissipating fins mounted in a group perpendicularly to said platform along an edge thereof, said fins being of sheet metal and slotted to form lips in thermal contact with said platform, the linear extent of contact being a substantial portion of the extent of the fin;
- and a circuit board mounted on one side of said platform whereby a stream of fluid coolant will cool the components on the circuit board and the fins.

2. A heat dissipating device as set forth in claim 1:
- and including an additional group of heat dissipating fins disposed along an edge of said platform opposite to the first said edge.

3. A heat dissipating device as set forth in claim 1:
- wherein said semiconductor platform is rectangular and has a thickness dimension substantially greater than the thickness dimension of said fins.

4. A heat dissipating device as set forth in claim 1:
- and including a second semiconductor platform parallel with the first said platform;
- and wherein said fins are additionally slotted to form lips in thermal contact with said second platform.

5. A heat dissipating device as set forth in claim 2:
- and including a second semiconductor platform parallel with the first said platform;
- and wherein both groups of fins are additionally slotted to form lips in thermal contact with said second platform.

6. A heat dissipating device as set forth in claim 2: wherein the number of fins in the first said group is substantially greater than the number of fins in the second said group, whereby a stream of fluid coolant from the direction of the group of fins of the lesser number will cool both groups substantially equally.

7. A heat dissipating device as set forth in claim 1: wherein said circuit board carries power transistor terminal receiving means.

8. A heat dissipating device as set forth in claim 1: wherein said fins are thin and a fraction of the thickness of said platform.

9. A heat dissipating device as set forth in claim 1: and including a thermal bonding material between said lips and said platform for decreasing the thermal resistance therebetween.

10. A heat dissipating device as set forth in claim 1: wherein said lips comprise two substantially equal lips, one on either side of said slot for providing two substantially equal thermal paths between said fins and said platform.

11. A heat dissipating device as set forth in claim 1: wherein said fins are composed of thin textured metal.

References Cited

UNITED STATES PATENTS

| | | | |
|---|---|---|---|
| 2,818,237 | 12/1957 | Lehr et al. | 165—80 |
| 3,086,283 | 4/1963 | Webber et al. | 29—157.3 |
| 3,171,069 | 2/1965 | Koltuniak et al. | 165—80 X |
| 3,216,496 | 11/1965 | Katz | 165—185 |
| 3,261,396 | 7/1966 | Trunk | 165—80 X |
| 3,313,340 | 4/1967 | Dubin | 165—80 |

FOREIGN PATENTS

| | | |
|---|---|---|
| 929,521 | 6/1955 | Germany. |
| 82,679 | 10/1919 | Switzerland. |

ROBERT A. O'LEARY, *Primary Examiner.*

A. W. DAVIS, Jr., *Assistant Examiner.*

U.S. Cl. X.R.

165—121; 174—16; 317—100, 234